(12) United States Patent
Jow

(10) Patent No.: US 7,614,916 B2
(45) Date of Patent: Nov. 10, 2009

(54) MEMORY CARD, MEMORY CARD ADAPTOR AND COMBINATION THEREOF

(76) Inventor: En-Min Jow, 11F, No. 38-15, Lane 72, Kwang Hwa 2nd Street, Hsinchu (TW)

( * ) Notice: Subject to any disclaimer, the term of this patent is extended or adjusted under 35 U.S.C. 154(b) by 172 days.

(21) Appl. No.: 11/896,782

(22) Filed: Sep. 6, 2007

(65) Prior Publication Data

US 2008/0227337 A1 Sep. 18, 2008

(30) Foreign Application Priority Data

Mar. 16, 2007 (TW) .............................. 96109123 A

(51) Int. Cl.
*H01R 25/00* (2006.01)
(52) U.S. Cl. ....................... 439/630; 439/638
(58) Field of Classification Search .................. 439/638, 439/630, 660, 680, 377
See application file for complete search history.

(56) References Cited

U.S. PATENT DOCUMENTS

| | | | |
|---|---|---|---|
| 6,511,350 B1 * | 1/2003 | Ito et al. ...................... | 439/680 |
| 6,908,038 B1 * | 6/2005 | Le .............................. | 439/638 |
| 7,025,637 B1 * | 4/2006 | Lee ............................. | 439/638 |
| 7,355,860 B2 * | 4/2008 | Miller et al. ................. | 439/638 |
| 7,404,741 B2 * | 7/2008 | Tanaka et al. ............... | 439/630 |
| 2006/0264109 A1 * | 11/2006 | Brewer et al. ............... | 439/630 |
| 2007/0128943 A1 * | 6/2007 | Tanaka et al. ............... | 439/630 |
| 2007/0293088 A1 * | 12/2007 | Hiew et al. .................. | 439/660 |

\* cited by examiner

*Primary Examiner*—Tho D Ta
(74) *Attorney, Agent, or Firm*—Rosenberg, Klein & Lee

(57) ABSTRACT

The present invention provides a first memory card, a memory card adaptor and a memory device combining the first memory card and the memory card adaptor. The first memory card has dual interfaces for the host, wherein one interface is the USB interface and dual interface contact pads are respectively arranged on different surfaces and different ends of the first memory card. The first memory card adaptor has an appearance of a second memory card and has the corresponding connecting structure for fixing the first memory card. Once the memory device is in the USB mode, the user can directly extract the memory card or just partially extract the memory card to expose those USB contact pads. Further, the memory card adaptor can hold the first memory card without loosening while partially extracting from the insertion port of the memory card adaptor.

17 Claims, 16 Drawing Sheets

MEMORY CARD, MEMORY CARD ADAPTOR AND COMBINATION THEREOF

BACKGROUND OF THE INVENTION

1. Field of the Invention

The present invention relates to a storage media. More particularly, the present invention relates to a memory card, a memory card adaptor and a combination thereof.

2. Description of the Prior Art

Accordingly, memory cards are commonly applied to many electronic products and having various types, such as SD memory card, MMC memory card, CF memory card, MS memory card, SM memory card, XD memory card, RS-MMC memory card, mini-SD memory card, and Trans Flash memory card, in the market. Because different electronic products are compatible for specific memory cards, so the user needs to purchase the extra memory card compatible for the electronic product. It causes the extra cost and the memory card is only compatible for the specific electronic product. In order to solve the forgoing problem, many manufacturers develop many adaptors.

Referring to FIG. 1, a adaptor 10 has an insertion notch 12 to position a memory card 14 and has a USB contact port 16 for connecting with the host compatible with the USB interface. Even the adaptor 10 can be designed with the different insertion notch for different memory card; however, the adaptor 10 is limited to apply to the USB-compatible electronic product.

Referring to FIG. 2, it illustrates an exemplary memory adaptor disclosed in the U.S. Pat. No. 7,152,801. The memory card 18 has dual interface contacts, which one contact 20 is for the USB interface. A sleeve 22 is assembling with the memory card 18 to expose another contact of the memory card 18.

SUMMARY OF THE INVENTION

One object of the present invention is to provide a memory card, a memory card adaptor and its combination thereof. The present invention provides a first memory card having dual interfaces at different surface and a memory card adaptor having an appearance of a second memory card. The user can insert the first memory card into the memory card adaptor, so as the memory device combination thereof can apply to the electronic product compatible for the second memory card.

Another object of the present invention is to provide a memory card, a memory card adaptor and its combination thereof. The present invention utilities the memory card adaptor to transfer the first memory card into a different second memory card for different interface, so as a user can save the cost for purchasing different memory cards.

The other object of the present invention is to provide a memory card, a memory card adaptor and its combination thereof. The memory device assembling the memory card and the memory adaptor is used as a flash card storage device once completely inserting said first memory card. The memory card can be partially extracted, which will turn the memory device into a USB mode and can be very easy to plug the device into a USB port of a USB host. In the USB mode, the memory device is functioned as a USB storage device. The memory card can also individually connect with a USB port via those USB contact pads for being as a USB flash storage device.

In accordance with the above objectives, one embodiment of the present invention is provided a memory card. The memory card includes: a substrate having a plurality of contact pads serving as a memory card interface and a plurality of USB contact pads serving as a USB interface, respectively arranged on different surface at different end; at least one memory chip arranged on one surface of the substrate for storing data, wherein those contact pads are on the surface and those USB contact pads are on another surface; a control element arranged on the surface of the substrate for controlling the data access of the memory chip; and a molding component covering the memory chip and the control element on the surface of the substrate to expose those contact pads and those USB contact pads.

Another embodiment of the present invention is provided a memory card adaptor applying to a memory card provided with dual interfaces which one is the USB interface. The memory card adaptor includes a shell body; an insertion port arranged at the shell body, wherein the insertion port is for inserting and extracting a first memory card; a plurality of internal contacts serving as an internal interface arranged inside the shell body, wherein those internal contacts contact a plurality of contact pads serving as a memory card interface of the first memory card upon insertion thereof into the insertion port; a plurality of external contacts serving as an external interface arranged and exposed outside the shell body; and a plurality of connect elements arranged inside the shell body to electrically connect those internal contacts and the external contacts.

Another embodiment of the present invention is provided a memory device. The memory device includes a first memory card and a memory card adaptor. The first memory card includes: a substrate having a plurality of contact pads serving as a memory card interface and a plurality of USB contact pads serving as a USB interface respectively arranged on different surface at different end; at least one memory chip arranged on one surface of the substrate for storing data, wherein those contact pads are on the surface and those USB contact pads are on another surface; a control element arranged on the surface of the substrate for controlling the data access of the memory chip; and a molding component covering the memory chip and the control element on the surface of the substrate to expose those contact pads and those USB contact pads. The memory card adaptor includes: a shell body; an insertion port arranged at the shell body for inserting and extracting the first memory card; a plurality of internal contacts serving as an internal interface arranged inside the shell body for contacting those conductive pads of the first memory card inserted into the insertion port; a plurality of external contacts serving as an external interface arranged and exposed outside the shell body; and a plurality of connect elements arranged inside the shell body to electrically connect those internal contacts and those external contacts, wherein those external contacts are exposed on the shell body. A width of said memory card interface is smaller than a width of an external interface formed on said memory card adaptor.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

Figure 1:
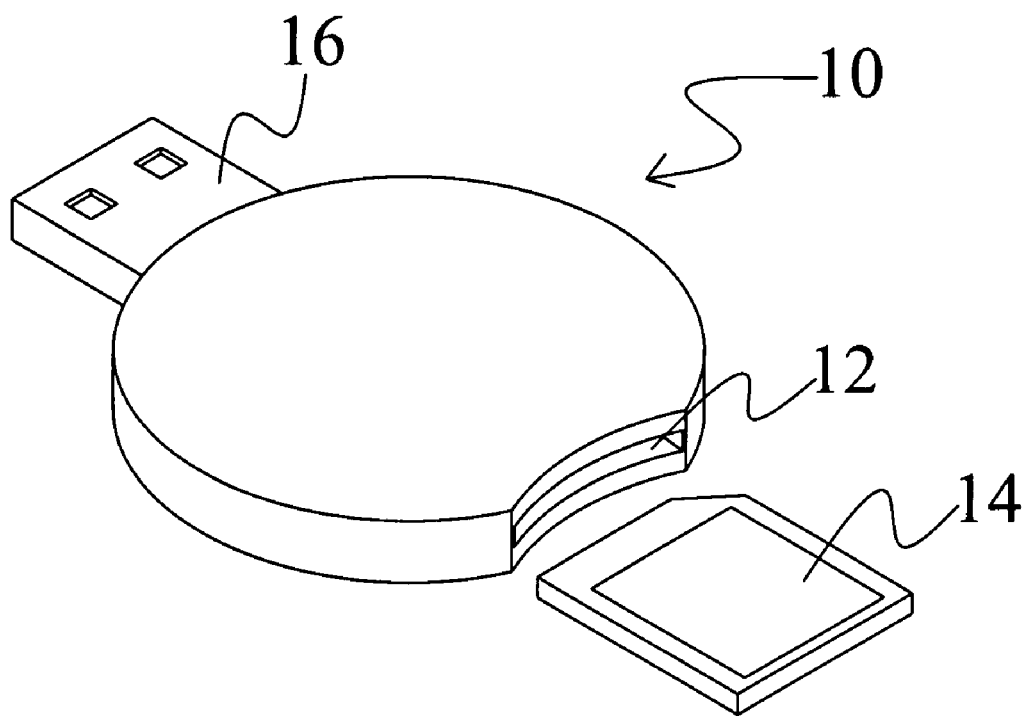
FIG. 1 is a schematic diagram of a memory card adaptor in accordance with one prior of the present invention.
Figure 2:
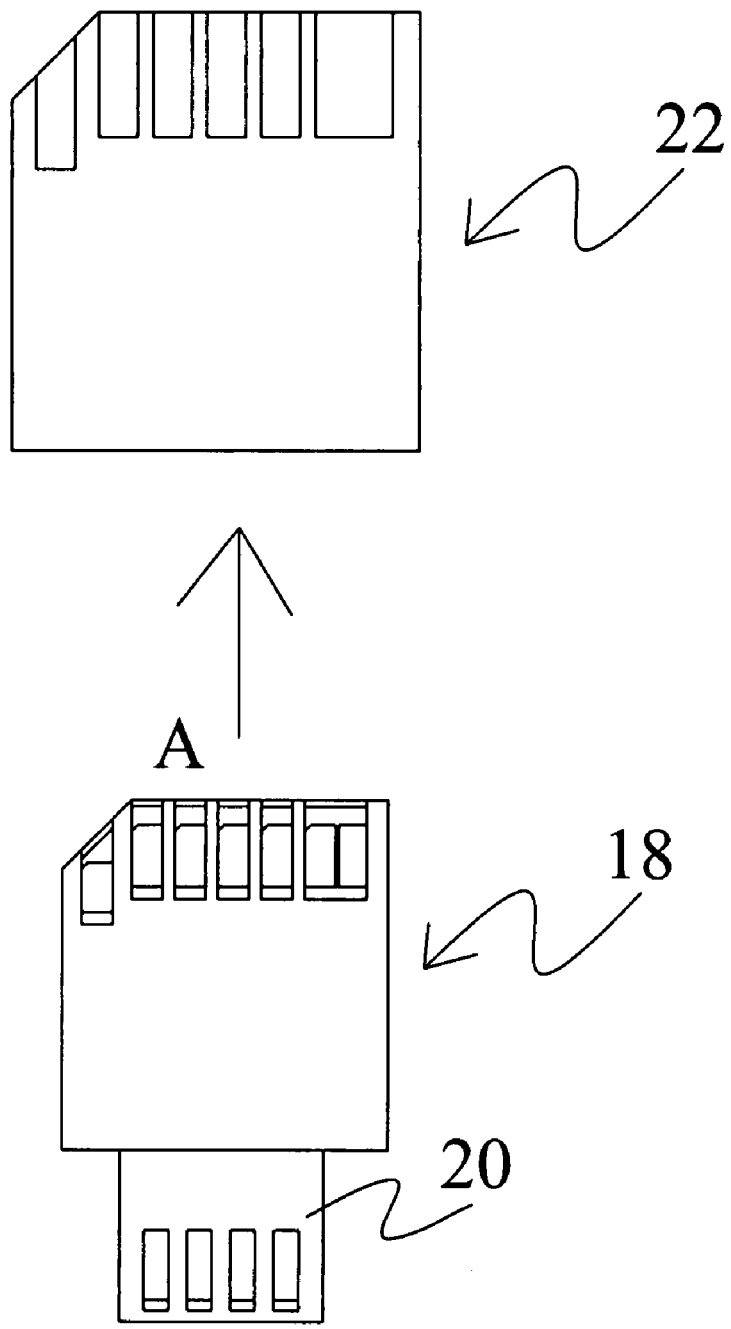
FIG. 2 is a schematic diagram of a memory card adaptor in accordance with the U.S. Pat. No. 7,152,801.
Figure 3:
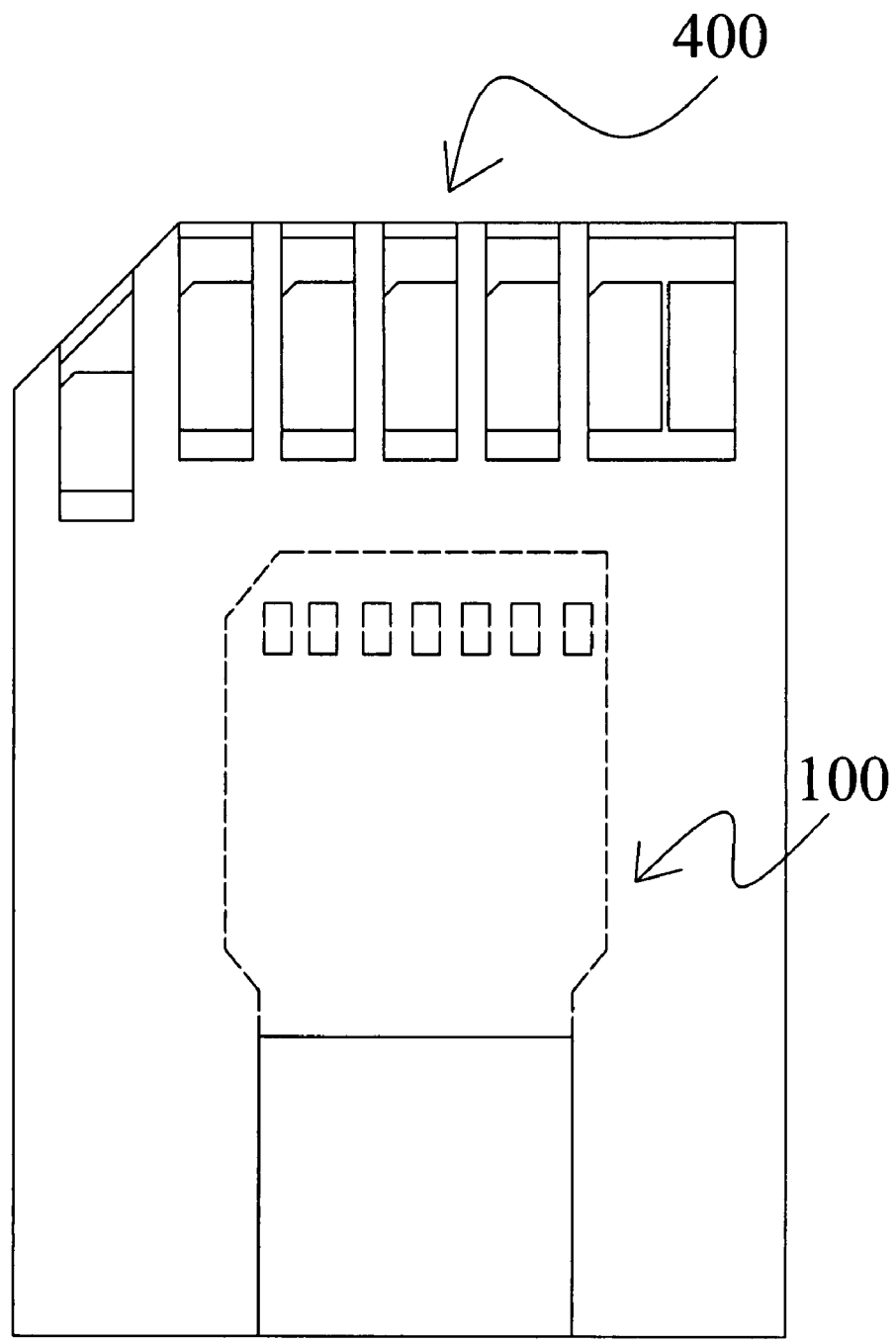
FIG. 3 is a schematic diagram of a memory device in accordance with one embodiment of the present invention.
Figure 4:
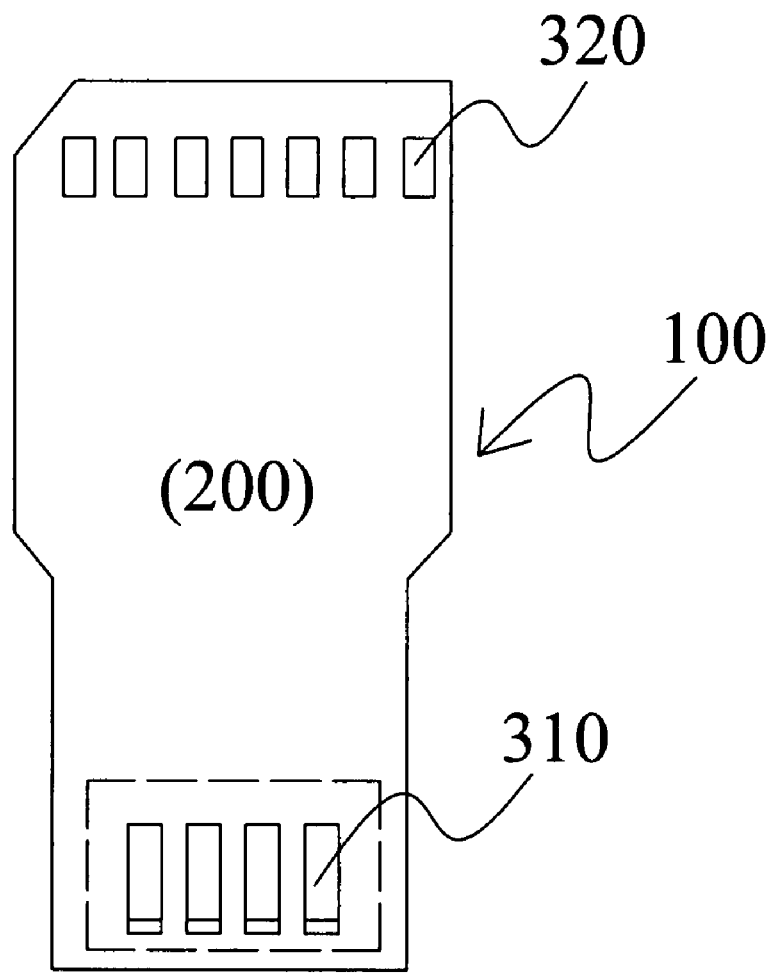
FIG. 4 is a schematic diagram of a memory card in accordance with one embodiment of the present invention.

FIG. 4 is a schematic diagram of a memory card in accordance with one embodiment of the present invention. The first memory card 100 includes a substrate 200 comprising a plurality of contact pads 320 serving as a memory card interface formed at a first end portion thereof and a plurality of USB contact pads 310 serving as a USB interface respectively arranged on different surface and formed at a second end portion thereof. As illustrated in FIG. 4, a ramp is formed on two opposite side of said substrates between said first and second end portions for facilitating removably insertion of said first memory card into said insertion port. As illustrated in FIG. 4, a width of second end portion of the first memory card 100 is smaller than that of the first end portion of the memory card 100. Wherein, the memory card interface is suitable for the interface of a SD memory card, a MMC memory card, a CF memory card, a MS memory card, a SM memory card, a XD memory card, a RS-MMC memory card, a mini-SD memory card, a Trans Flash memory card or a smart card.

Figure 12:
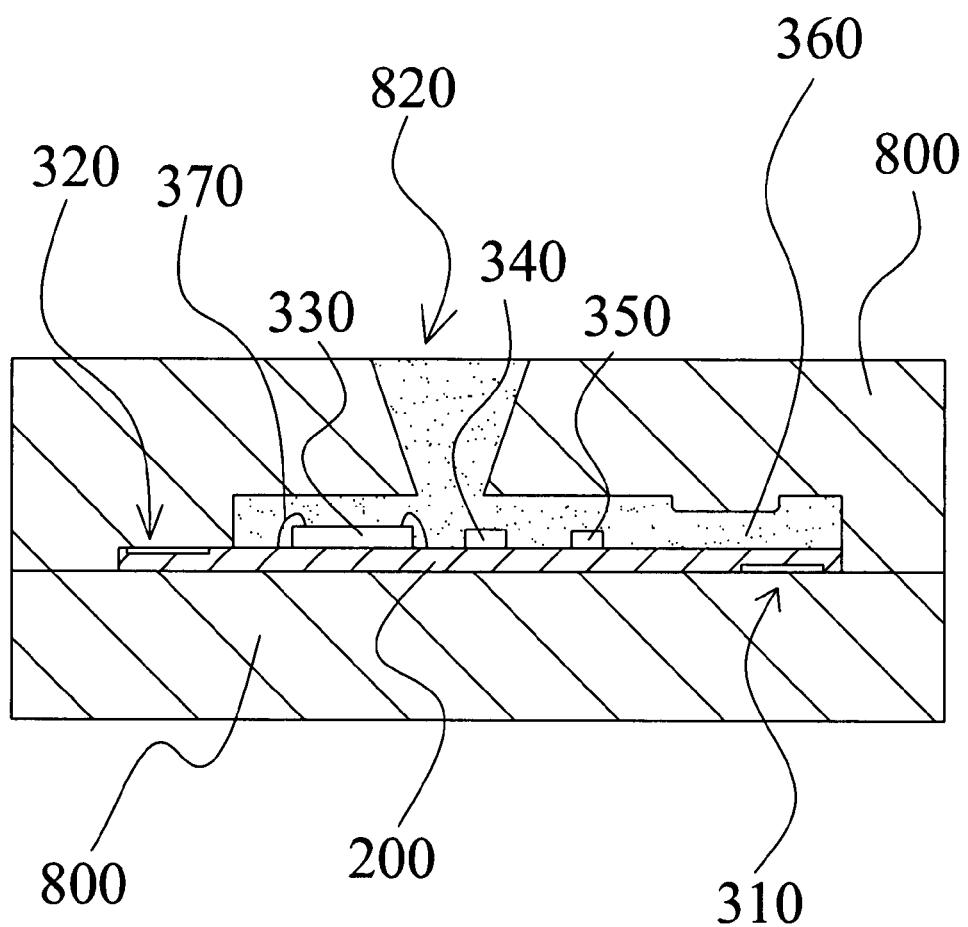
FIG. 12 is a schematic diagram illustrating the manufacturing method for a memory card in accordance with one embodiment of the present invention.

Simultaneously referring to FIG. 12, the first memory card includes at least one memory chip 330 for storing data and arranged on the surface where those contact pads 320 is thereon. For example, the memory chip 330 can be a non-volatile memory, a NAND flash memory, a SLC (Single-level Cell) NAND flash memory or a MLC (Multi-level Cell) NAND flash memory. An electrically connecting structure, such as a plurality of wires 370 or solder balls, is for electrically connecting the memory chip 330 and the substrate 200. Further, those USB contact pads 310 are on another surface of the substrate 200. A control element 340 is arranged on the surface of the substrate 200 for controlling the data access of the memory chip 330. The control element 340 has dual interfaces, one interface is the USB interface and another is interface for a SD memory card, a MMC memory card, a CF memory card, a MS memory card, a SM memory card, a XD memory card, a RS-MMC memory card, a mini-SD memory card, a Trans Flash memory card or a smart card. Besides, at least one passive element 350 is arranged on the surface of the substrate 200. A molding component 360 is arranged to cover the memory chip 330, the control element 340 and the passive element 350.

The molding component 360 is a one-piece formed structure by injection molding. The one-piece formed structure is configured by assembling mold elements 800 and then the molding component 360 is injected into the injection hole 820 to form the one-piece formed structure and to expose those contact pads 320 and those USB contact pads 310 on different surface at different ends of the substrate 200. The residual molding component 360 within the injection hole 820 will be removed. The thickness of the first memory card 100 at the end of those contact pads 320 is thinner than the thickness of the first memory card 100 at the end of the USB contact pads 310. The width of the first memory card 100 at the end of the contact pads 320 is wider than the width of the first memory card 100 at the end of the USB contact pads 310, so as the first memory card 100 has two protruding edges on two sides between two ends. Those protruding edges can be formed by the molding component or the shape of the substrate.

In one embodiment of the first memory card, not shown in figures, because the molding component is a one-piece formed structure, the molding component can be design to have a pair of protruding bars arranged on another surface of the substrate at both sides of the USB contact pads for providing the fixing function when the first memory card is used and inserted into a USB connecting port. Hence, the substrate has two through openings for the molding component to inject into to form protruding bars on another surface of the substrate. Further, the molding component can be design to have a concave trench on the surface of the substrate. The concave trench can improve the friction for inserting or extracting the first memory card.

Figure 5:
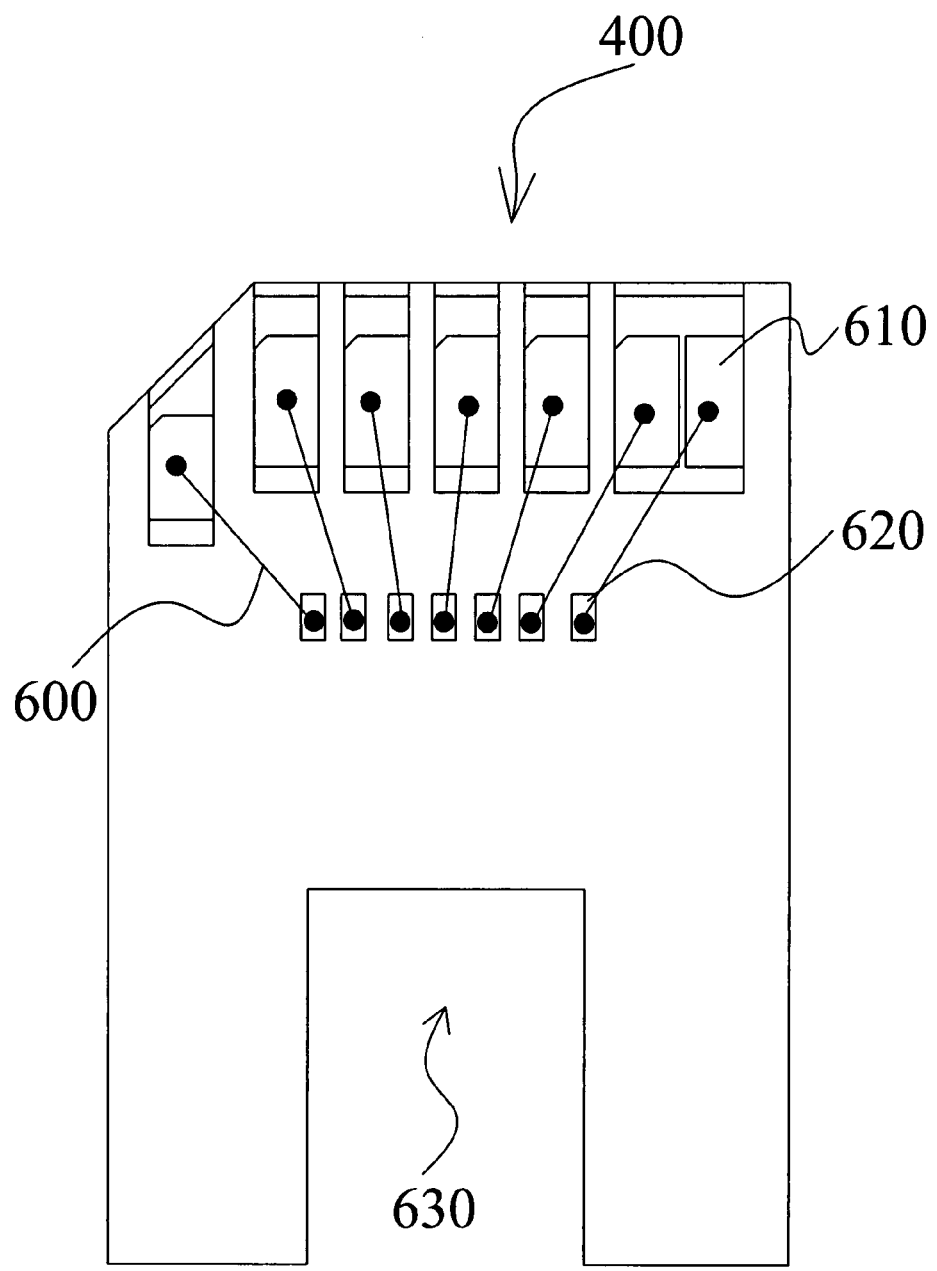
FIG. 5 is a schematic diagram of the front view of a memory device adaptor in accordance with one embodiment of the present invention.
Figure 6:
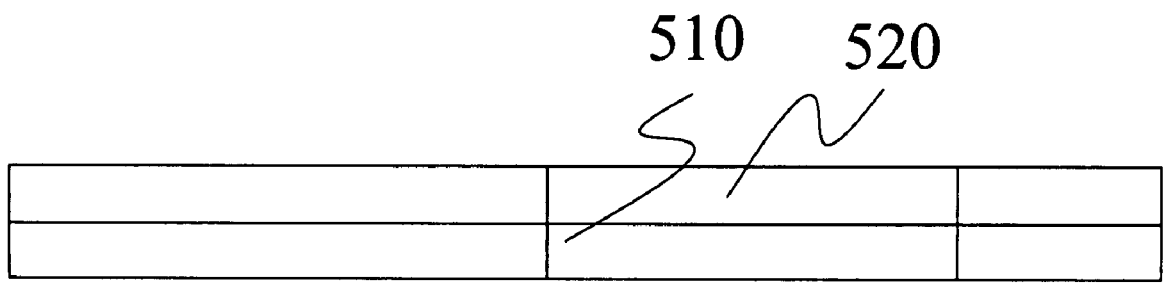
FIG. 6 is a schematic diagram of the lateral view of a memory card adaptor in accordance with one embodiment of the present invention.
Figure 7:
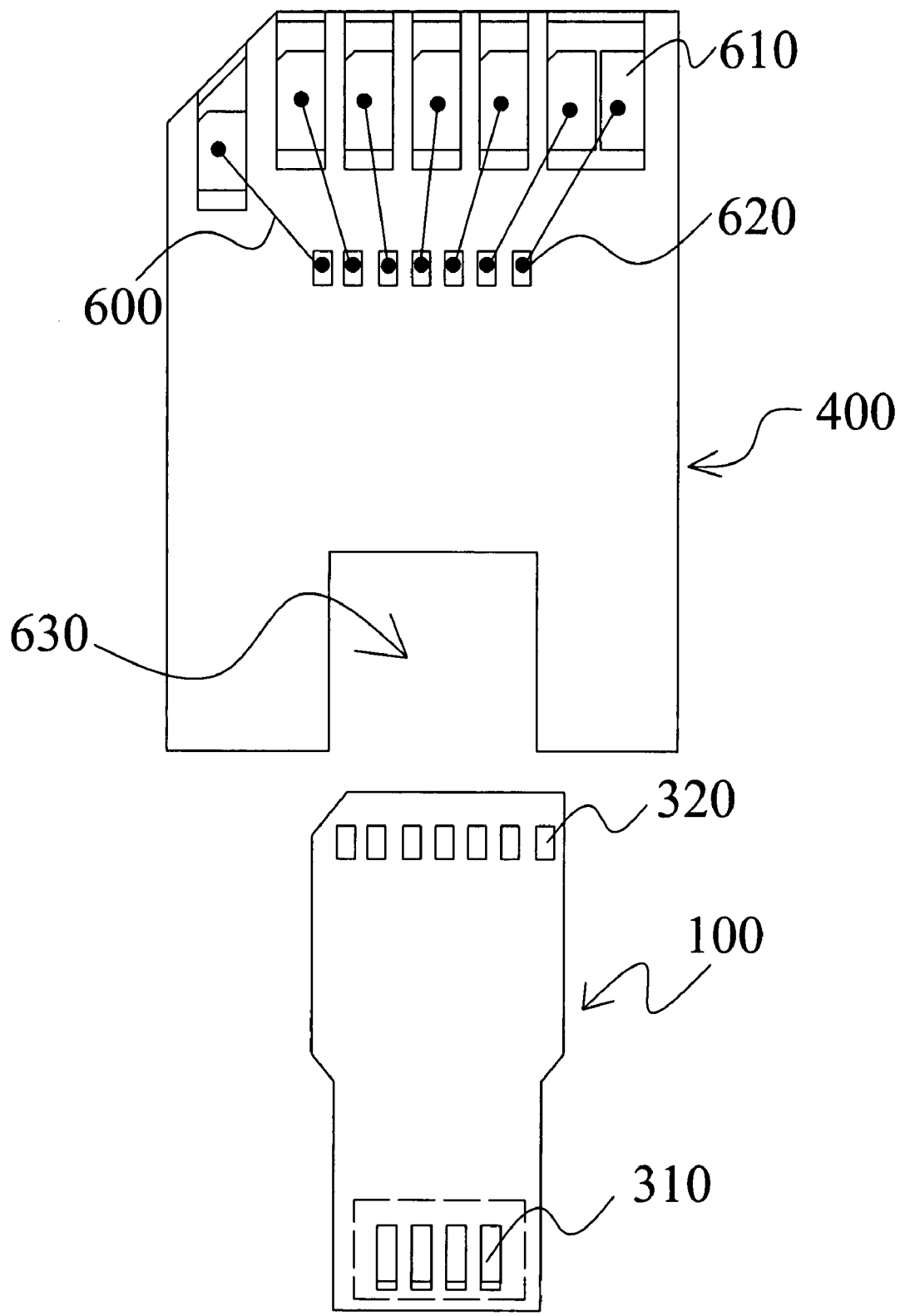
FIGS. 7, FIGS. 8 and FIGS. 9 are schematic diagrams for illustrating the assembling of a memory device in accordance with one embodiment of the present invention.

Referring to FIG. 5, FIG. 6 and FIG. 7, in one embodiment of the memory card adaptor 400 is applied to the first memory card 100 provided with dual interfaces, and one of which is a USB interface. The memory card adaptor 400 includes a shell body. Such as shown in FIG. 6, the shell body includes a top cover 520 and a bottom cover 510 constituting a shape of a memory card such as a SD memory card, a MMC memory card, a CF memory card, a MS memory card, a SM memory card, a XD memory card, a RS-MMC memory card, a mini-SD memory card, a Trans Flash memory card or a smart card. An insertion port 630 is arranged at the shell body for inserting and extracting the first memory card 100. A plurality of internal contacts 620 serving as an internal interface is arranged inside the shell body for contacting those contact pads 320 of the first memory card 100 and a plurality of external contacts 610 serving as an external interface is arranged and exposed outside the shell body. Further, a plurality of connect elements 600 are arranged inside the shell body to electrically connect those internal contacts 620 and those external contacts 610. In one embodiment, each internal contact 620 and each external contact 610 can be formed as a one-piece metal element, with each connect element 600.

Figure 8:
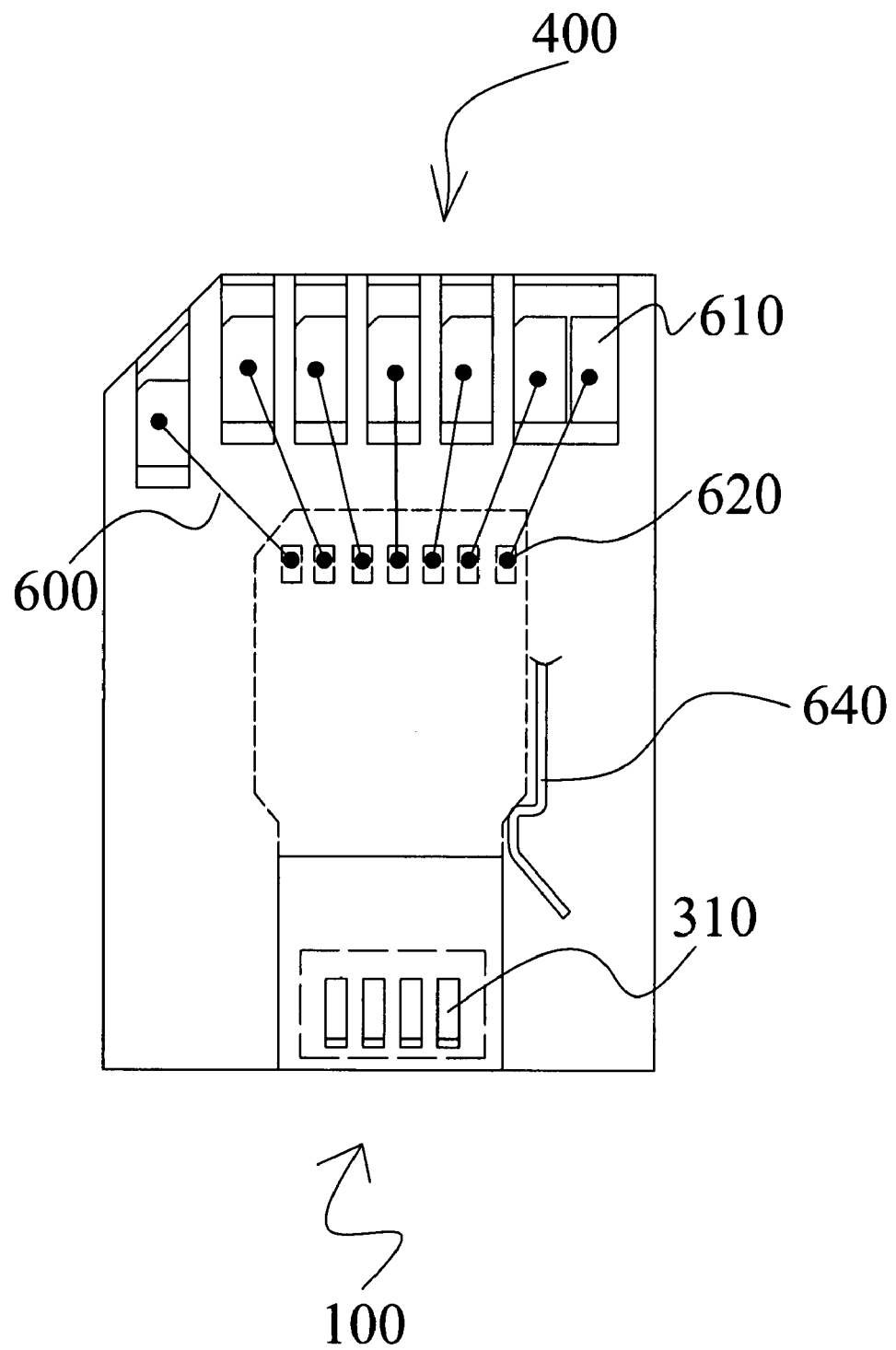
Figure 9:
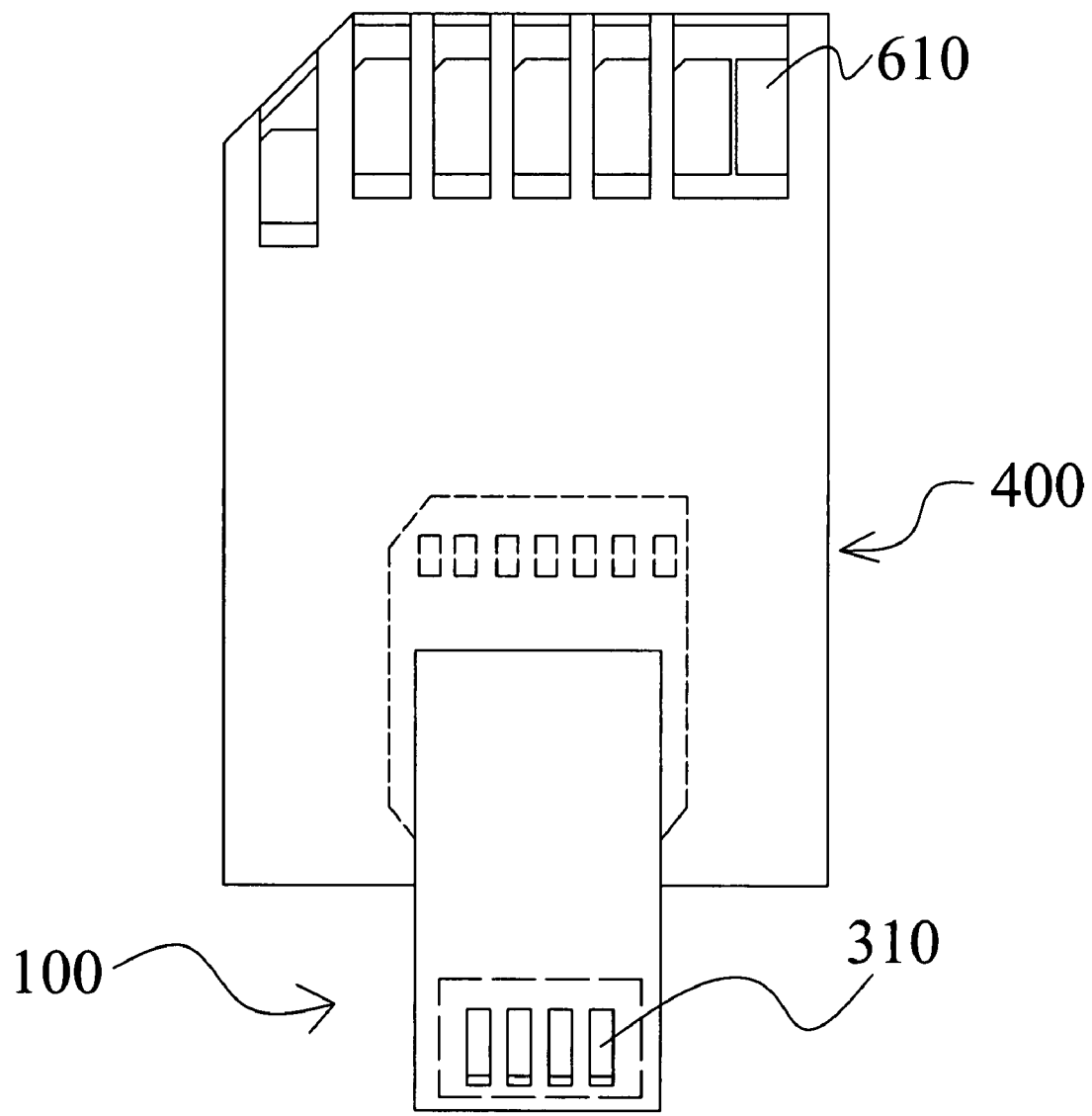

Such as shown in FIG. 8, in order to fix the inserted first memory card 100, a connecting structure 640, such as a latch-connecting, a clip-connecting, or a notch-connecting structure, is further arranged inside the shell body for fixing the first memory card 100 in the insertion port. A sub-connecting structure (not shown in the figure) can be design inside the shell body to hold the first memory card 100 when the first memory card 100 partially extracts from the insertion port of the memory card adaptor 400, as shown in FIG. 9.

Referring to FIG. 8, in one embodiment of the memory device, the memory device includes a first memory card 100 and a memory card adaptor 400 which are mentioned above. Such as shown in FIG. 12, the first memory card 100 includes a substrate 200 having contact pads 320 serving as a memory card interface and USB contact pads 310 serving as a USB interface for connection with a USB host. Contact pads 320 and USB contact pads 310 are respectively arranged on different surfaces at different ends thereon. As illustrated in FIG. 8, a width of said memory card interface is smaller than a width of an external interface formed on said memory card adaptor. At least one memory chip 330 and a control element 340 are arranged on the surface where contact pads 320 are thereon. Those USB contact pads 310 are on another surface. A molding component 360 is to cover the memory chip 330, the control element 340 on the surface of the substrate 200 and to expose those contact pads 320 and those USB contact pads 310. Simultaneously referring to FIG. 8 and FIG. 12, the memory card adaptor 400 includes a shell body and an insertion port 630 arranged at the shell body for inserting and extracting the first memory card 100. A plurality of internal contacts 620 serving as an internal interface arranged inside the shell body for contacting those contact pads 320 of the first memory card 100 and a plurality of external contacts serving as an external interface are arranged and exposed outside the shell body. Further, a plurality of connect elements 600 are arranged inside the shell body to electrically connect those internal contacts 620 and those external contacts 610.

In one embodiment of the memory device, after assembling the first memory card and the memory card adaptor, the first memory card is un-removable from the memory card adaptor. As shown in FIG. 8, the first memory card can completely insert into the insertion port of the memory card adaptor for the host interface mode, which will turn the memory device to function as a SD, a MMC or a MS memory card depends on what the card adaptor to be applied, or partially extracted from the insertion port to expose USB contact pads for the USB interface mode, such as shown in FIG. 9.

Referring to FIG. 8, as the memory device in the host interface mode and the first memory card completely inserting the insertion port, a connecting structure 640, such as the latch-connecting, clip-connecting or notch-connecting structure, is arranged for fixing the first memory card. The protruding edges on two sides between two ends of the first memory card 100 can match the connecting structure of the memory card adaptor 400, so as to fix and hold the first memory card 100. As first memory card 100 partially extracting from the insertion port for the USB interface mode, the memory card adaptor 400 has a sub-connecting structure (not shown in figures) arranged in the shell body to hold the first memory card 100 in a partial extracted appearance as shown in FIG. 9, which will turn the device into a USB mode and can be very easy to plug the device into a USB port of a USB host. In the USB mode, the memory device is functioned as a USB storage device.

In one embodiment, the first memory card is removable from the memory cad adaptor. The first memory card can be partially or completely extracted from the insertion port for using in the USB interface mode, referring to FIG. 7 and FIG. 9.

Figure 10:
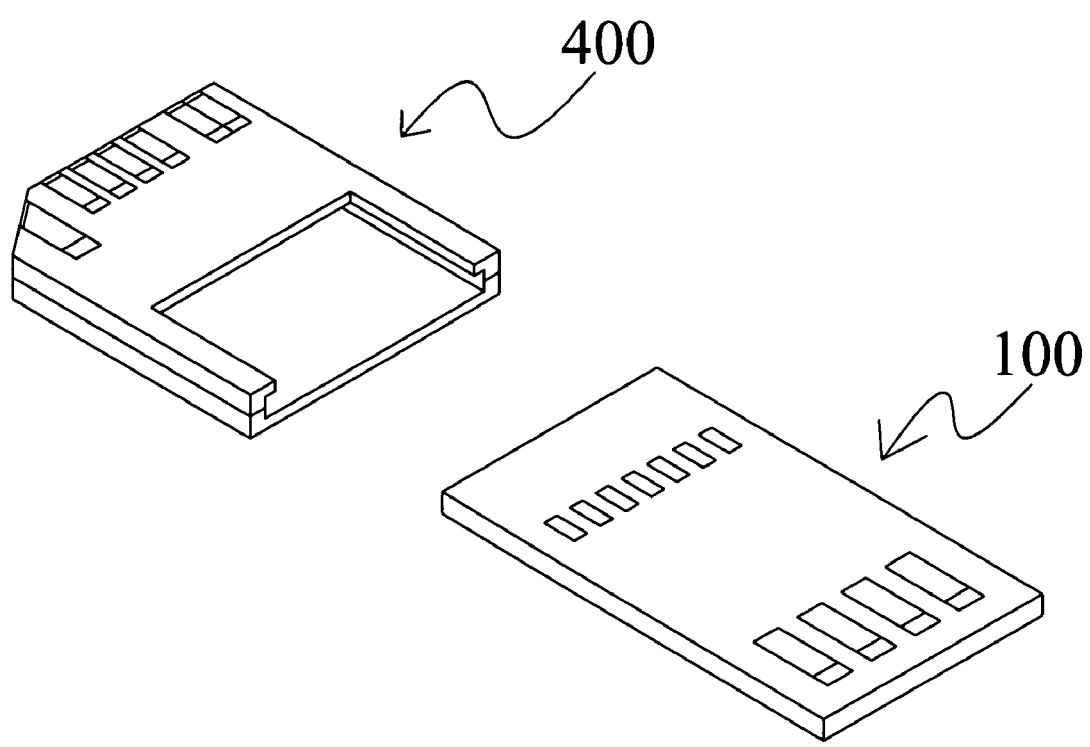
FIGS. 10 and FIGS. 11 are 3-D schematic diagrams of a memory card and a memory card adaptor in accordance with different embodiments of the present invention.
Figure 11:
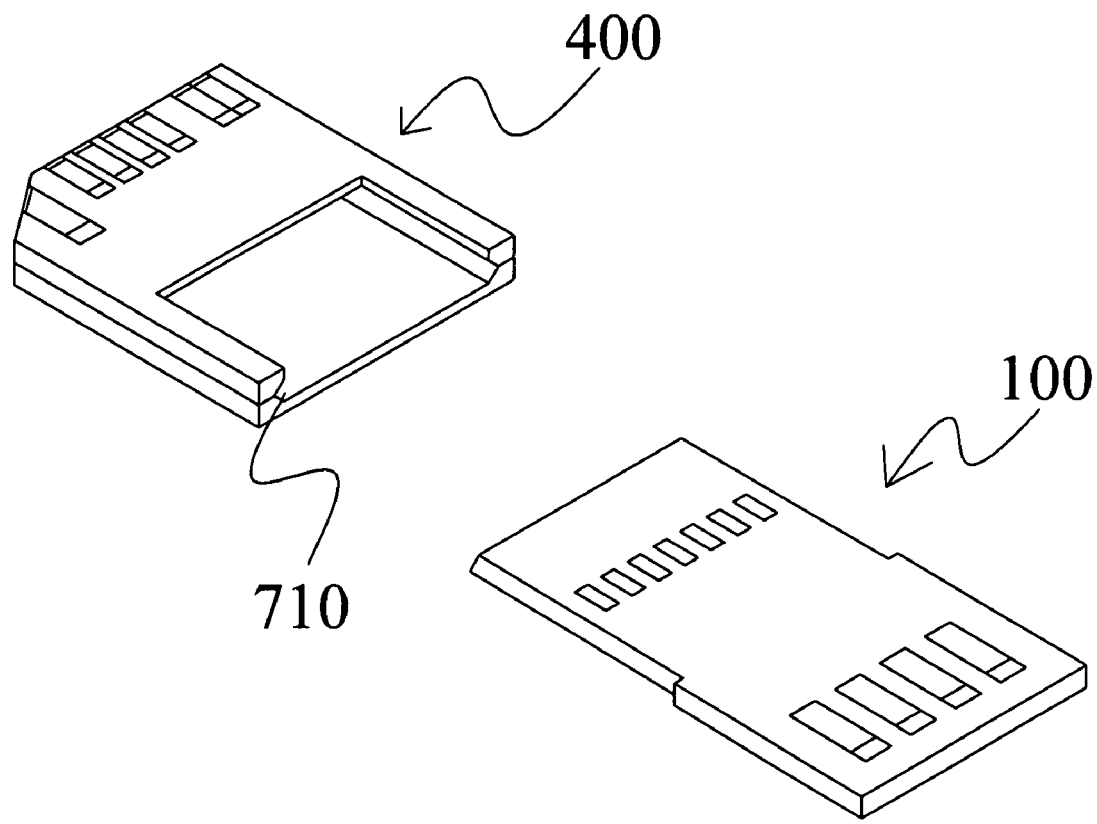

Referring to FIG. 10, in one embodiment, the first memory card 100 can be partially inserted into the memory card adaptor 400, hence the USB interface is exposed outside. The memory device can choose the required interface for inserting into the host. Referring to FIG. 11, in one embodiment, the memory card adaptor 400 has a notch-connecting structure 710 to locate the position of the first memory card 100.

Figure 13A:
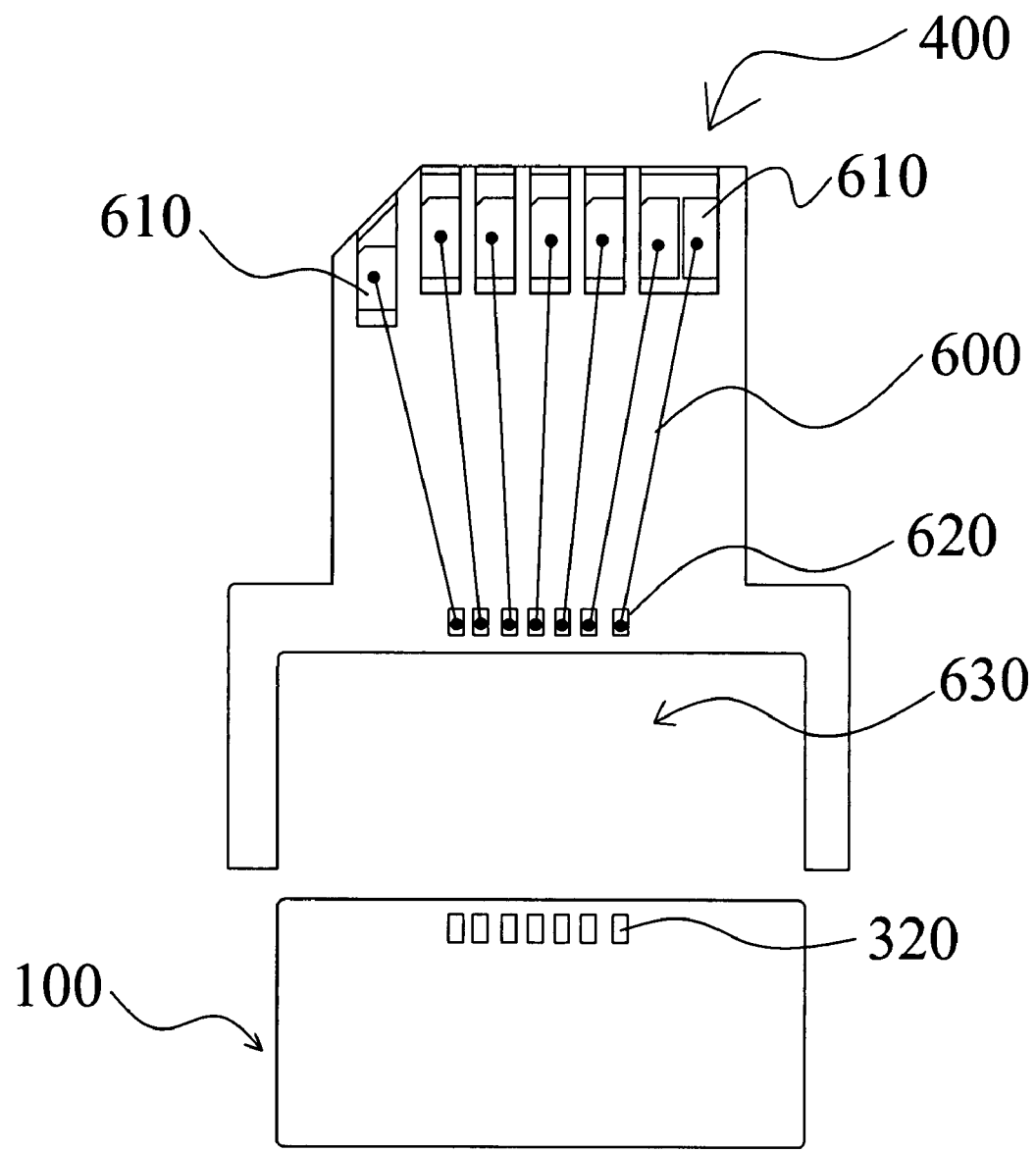
FIGS. 13A and FIGS. 13B are schematic diagrams illustrating one embodiment of the present invention.
Figure 13B:
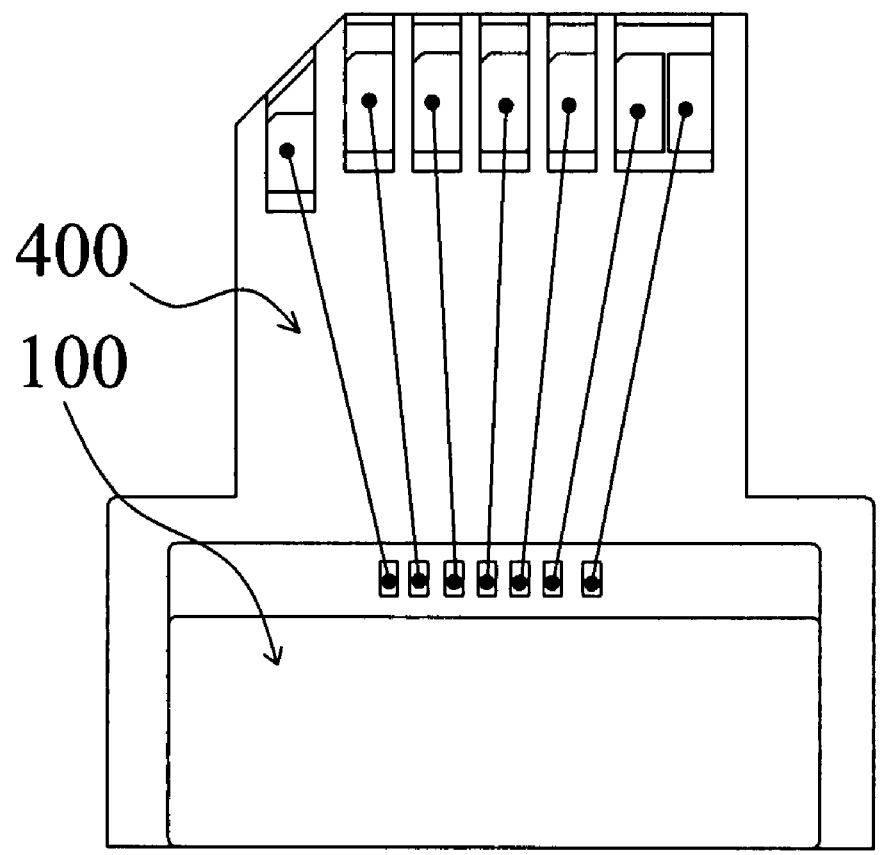

Referring to FIG. 13A and FIG. 13B, the memory card adaptor 400 has a partial appearance of the second memory card. The memory device combining the first memory card 100 and the memory card adaptor 400 can have a partial appearance of the memory card, such as shown in FIG. 13B or have a complete appearance of the second memory card as the forgoing description.

Figure 14:
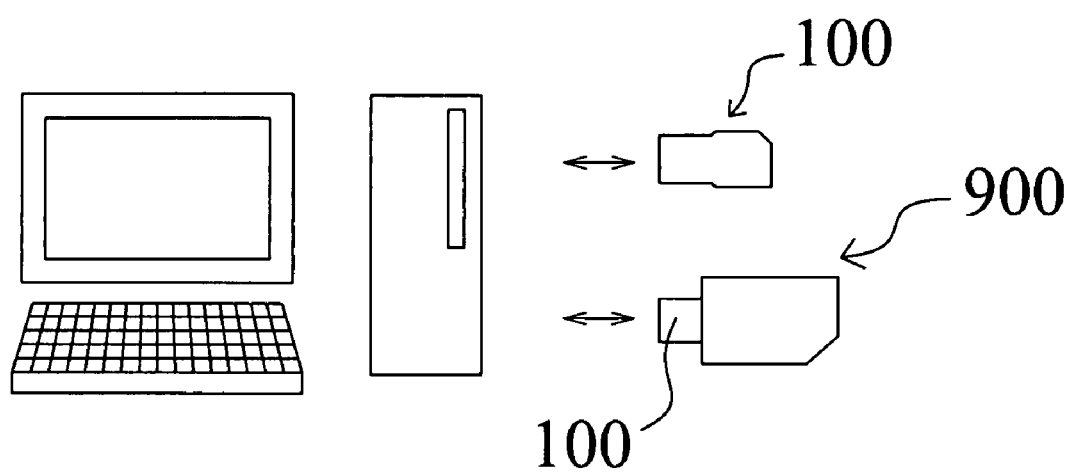
FIG. 14 is a schematic diagram illustrating one embodiment of the present invention.
Figure 15A:
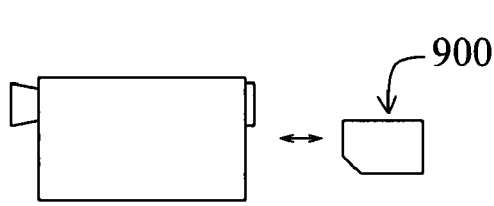
FIG. 15A, FIG. 15B, FIG. 15C, FIG. 15D, FIG. 15E, FIG. 15F, FIG. 15G, FIG. 15H, FIG. 15I and FIS. 15J are schematic diagrams illustrating embodiments of the present invention.
Figure 15F:
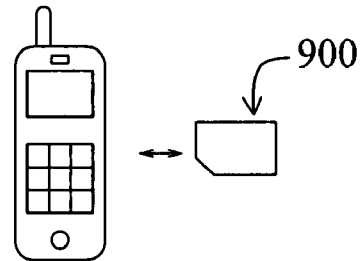
Figure 15B:
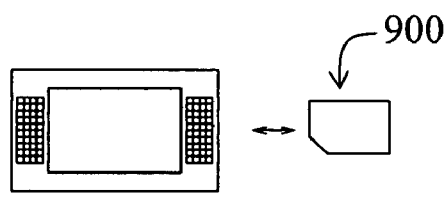
Figure 15G:
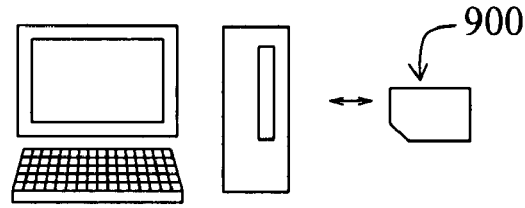
Figure 15C:
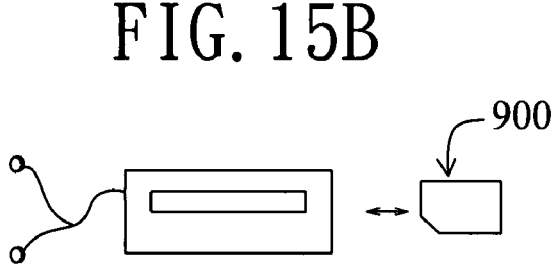
Figure 15H:
Figure 15D:
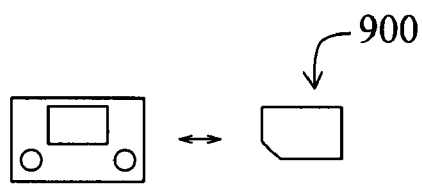
Figure 15I:
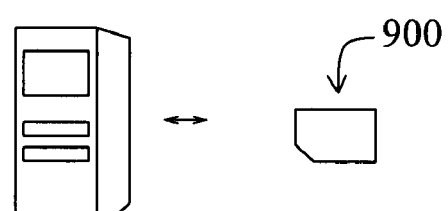
Figure 15E:
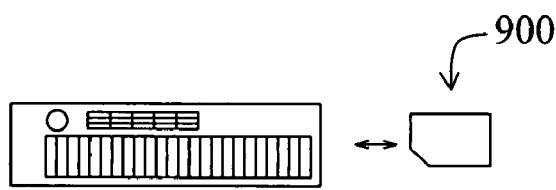
Figure 15J:
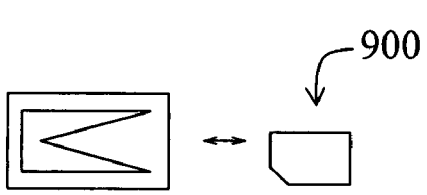

Referring to FIG. 14, the first memory card 100 or the memory device 900 can be used and connected with a USB host, for example a personal computer. The first memory card 100 can be partially extracted, which will turn the memory device 900 into a USB mode and can be very easy to plug the device into a USB port of a USB host. In the USB mode, the memory device 900 is functioned as a USB storage device. The first memory card 100 can also individually plug into a USB port of a USB host for being as a USB flash storage device.

As described above, in the host interface mode, the memory device 900 can be used in various apparatus such as shown in FIGS. 15A to 15J, as well as in portable electric devices. That is, the memory device 900 can be used in a video camera shown in FIG. 15A, a television set shown in FIG. 15B, an audio apparatus shown in FIG. 15C, a game apparatus shown in FIG. 15D, an electric musical instrument shown in FIG. 15E, a cell phone shown in FIG. 15F, a personal computer shown in FIG. 15G, a personal digital assistant (PDA) shown in FIG. 15H, a voice recorder shown in FIG. 15I, and a PC card shown in FIG. 15J. The memory device 900 can also plug into all these apparatus as a storage device by the USB mode if these apparatus are equipped with USB ports.

To sum up the foregoing, the present invention provides a first memory card, a memory card adaptor and a memory device combining the first memory card and the memory card adaptor. The first memory card has dual interfaces for the host, and at least one of which is a USB interface. The contact pads for the two different interfaces are respectively arranged on different surfaces and different ends of the first memory card. The first memory card adaptor has the corresponding connecting structure for fixing the first memory card. Once the memory device is in the USB mode, the user can directly extract the memory card or just partially extract the memory card to expose those USB contact pads. The memory card adaptor can hold the first memory card without loosening while partially extracting from the insertion port.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A memory card, comprising:
  a substrate having a plurality of contact pads formed at a first end thereof for serving as a memory card interface for removably electrically connecting with an external interface of a memory card adaptor within said memory card adapter, and a plurality of USB contact pads formed at a second end thereof wherein a width of said memory card interface is smaller than a width of an external interface formed on said memory card adaptor;

at least one memory chip arranged on said substrate for storing data;

a control element arranged on said substrate for controlling data access of said memory chip; and a molding component covering said memory chip and said control element on said substrate, wherein said contact pads and said USB contact pads are exposed.

2. The memory card according to claim 1, further comprising at least a passive element arranged on said substrate and covered within said molding component.

3. The memory card according to claim 1, wherein said molding component is formed as a one-piece structure and has a pair of protruding bars arranged on said substrate at both sides of said USB contact pads.

4. The memory card according to claim 1, wherein said molding component is formed as a one-piece structure and has a concave trench on said substrate.

5. The memory card according to claim 1, wherein a thickness of said first end is thinner than a thickness of said second end.

6. The memory card according to claim 1, wherein said contact pads via said external interface of said memory card adaptor are adopted for connecting to an interface of a SD memory card, a MMC memory card, a CF memory card, a MS memory card, a SM memory card, a XD memory card, a RS-MMC memory card, a mini-SD memory card, a Trans Flash memory card or a smart card.

7. The memory card according to claim 1, wherein said control element has dual interfaces including a USB interface and said memory card interface for connecting to a SD memory card, a MMC memory card, a CF memory card, a MS memory card, a SM memory card, a XD memory card, a RS-MMC memory card, a mini-SD memory card, a Trans Flash memory card or a smart card.

8. The memory card according to claim 1, wherein said memory chip is a non-volatile memory, a NAND flash memory, a SLC NAND flash memory or a MLC NAND flash memory.

9. The memory card according to claim 1, wherein said memory card can directly connect with a USB port and function as a USB flash storage device.

10. A memory device, comprising:

a first memory card and a memory card adaptor, wherein said first memory card, comprising:

a substrate having a plurality of contact pads formed at a first end portion thereof for serving as a memory card interface and a plurality of USB contact pads formed at a second end portion thereof, wherein a ramp is formed on two opposite sides of said substrate between said first and second end portions for facilitating removable insertion of said first memory card into said insertion port;

at least one memory chip arranged on a surface of said substrate for storing data;

a control element arranged on said substrate for controlling data access of said memory chip; and a molding component covering said memory chip and said control element on said surface of said substrate, wherein said contact pads and said USB contact pads are exposed; and said memory card adaptor for said memory card, comprising:

a shell body;

an insertion port arranged at said shell body for inserting and extracting said memory card;

a plurality of internal contacts serving as an internal interface arranged inside said shell body for contacting said conductive pads of said memory card inserted into said insertion port;

a plurality of external contacts servicing as an external interface arranged and exposed outside said shell body; and a plurality of connect elements arranged inside said shell body to electrically connect said internal contacts and said external contacts, wherein a width of said internal interface is smaller than a width of said external interface.

11. The memory device according to claim 10, wherein said molding component is formed as a one-piece structure and has a pair of protruding bars arranged on said another surface of said substrate at both sides of said USB contact pads.

12. The memory device according to claim 10, wherein said first memory card is removable from said memory card adaptor.

13. The memory device according to claim 10, wherein said memory device functions as a USB storage device when said memory device is partially inserted into a slot and electrically connects to a USB interface of a host and functions as a flash card storage device when said memory device is completely inserted into a memory card slot of a host.

14. The memory device according to claim 10, wherein said shell body comprises:

a top cover and a bottom cover having a shape of a second memory card.

15. The memory device according to claim 14, wherein said said bottom cover comprises a shape of a SD memory card, a MMC memory card, a CF memory card, a MS memory card, a SM memory card, a XD memory card, a RS-MMC memory card, a mini-SD memory card, a Trans Flash memory card or a smart card.

16. The memory device according to claim 10, wherein said first memory card is un-removable from said memory device after assembling with said memory card adaptor.

17. The memory device according to claim 16, wherein said first memory card is partially is being extracted from said insertion port to expose said USB contact pads for connecting with a USB host.

* * * * *